(12) United States Patent
Holt et al.

(10) Patent No.: US 7,341,258 B2
(45) Date of Patent: Mar. 11, 2008

(54) CAMMED SEAL ASSEMBLY WITH SEALING RING HAVING AN ANGLED LEG PORTION AND FOOT PORTION WITH ELASTOMERIC ENERGIZER ELEMENT

(75) Inventors: Augustus Brooks Holt, Royersford, PA (US); Paul E. Roberts, Wyndmoor, PA (US); Alan P. Schofield, Lansdale, PA (US)

(73) Assignee: Greene, Tweed of Delaware, Inc., Wilmington, DE (US)

( * ) Notice: Subject to any disclaimer, the term of this patent is extended or adjusted under 35 U.S.C. 154(b) by 0 days.

(21) Appl. No.: 10/949,425

(22) Filed: Sep. 24, 2004

(65) Prior Publication Data

US 2006/0066058 A1 Mar. 30, 2006

(51) Int. Cl.
*F16J 15/00* (2006.01)
(52) U.S. Cl. .................................. 277/584; 277/589
(58) Field of Classification Search ............... 277/437, 277/438, 569, 584, 589, 619, 638, 639
See application file for complete search history.

(56) References Cited

U.S. PATENT DOCUMENTS

| | | | | |
|---|---|---|---|---|
| 2,857,184 A | * | 10/1958 | Mancusi, Jr. | 277/468 |
| 2,930,608 A | * | 3/1960 | Hogan et al. | 267/64.13 |
| 3,011,803 A | * | 12/1961 | Buckner et al. | 285/23 |
| 3,097,855 A | * | 7/1963 | Allen | 277/584 |
| 3,218,087 A | * | 11/1965 | Hallesy | 277/532 |
| 3,394,939 A | * | 7/1968 | Mastro | 277/309 |
| 3,394,941 A | * | 7/1968 | Traub | 277/584 |
| 3,426,654 A | * | 2/1969 | Laughman | 92/125 |
| 3,663,024 A | * | 5/1972 | Traub | 277/589 |
| 3,718,338 A | * | 2/1973 | Traub | 277/584 |
| 3,765,690 A | * | 10/1973 | Sievenpiper | 277/556 |
| 4,027,816 A | * | 6/1977 | Slator et al. | 277/437 |
| 4,053,166 A | * | 10/1977 | Domkowski | 277/558 |
| 4,067,407 A | | 1/1978 | Berg | 277/553 |
| 4,150,836 A | * | 4/1979 | Walker | 277/638 |
| 4,194,795 A | * | 3/1980 | Rife | 384/93 |
| 4,201,392 A | * | 5/1980 | Watts | 277/558 |
| 4,229,013 A | | 10/1980 | Burke | 277/584 |
| 4,231,578 A | * | 11/1980 | Traub | 277/572 |
| 4,239,244 A | * | 12/1980 | Brent | 277/584 |
| 4,252,331 A | * | 2/1981 | Siegel | 277/589 |
| 4,262,915 A | * | 4/1981 | Williams | 277/560 |
| 4,268,045 A | * | 5/1981 | Traub | 277/589 |

(Continued)

*Primary Examiner*—Richard E. Chilcot
*Assistant Examiner*—Gay Ann Spahn
(74) *Attorney, Agent, or Firm*—Flaster/Greenberg, P.C.

(57) ABSTRACT

A seal assembly seals first and second operational surfaces spaced apart by a gap. The first surface includes a seal groove having a base surface and first and second side surfaces. A sealing element in the seal groove has a foot portion extending parallel to the base surface which engages the second operational surface. A leg portion extending from the foot portion toward the base surface has first and second surfaces. A back-up ring adjacent to the sealing element prevents extrusion of the sealing element into the gap. A first side of the back-up ring mates with the second surface of the leg portion, and a second side mates with one of the first and second side surfaces of the seal groove. An energizer element located between the base surface and the foot portion applies uniform pressure to the leg and foot portions when the energizer element is compressed.

12 Claims, 4 Drawing Sheets

U.S. PATENT DOCUMENTS

| | | | | |
|---|---|---|---|---|
| 4,349,205 A * | 9/1982 | McGee et al. | | 277/564 |
| 4,352,498 A | 10/1982 | Burke | | 277/311 |
| 4,411,439 A * | 10/1983 | Couvillion et al. | | 277/584 |
| 4,421,323 A | 12/1983 | Burke | | 277/336 |
| 4,421,330 A | 12/1983 | Burke | | 277/584 |
| 4,433,847 A * | 2/1984 | Weinberg | | 277/342 |
| 4,437,674 A * | 3/1984 | Fling | | 277/584 |
| 4,560,174 A * | 12/1985 | Bisi | | 277/382 |
| 4,566,702 A * | 1/1986 | Traub | | 277/589 |
| 4,570,944 A * | 2/1986 | Traub | | 277/572 |
| 4,576,386 A * | 3/1986 | Benson et al. | | 277/584 |
| 4,635,945 A * | 1/1987 | Beck | | 277/530 |
| 4,674,754 A * | 6/1987 | Lair et al. | | 277/311 |
| 4,840,379 A | 6/1989 | Thoman, Jr. | | 277/584 |
| 4,889,351 A * | 12/1989 | Frost | | 277/460 |
| 4,893,823 A | 1/1990 | Strouse | | 277/437 |
| 4,953,876 A * | 9/1990 | Muller | | 277/556 |
| 4,991,495 A * | 2/1991 | Loegel, et al. | | 92/165 R |
| 5,143,382 A * | 9/1992 | Maringer | | 277/584 |
| 5,149,107 A * | 9/1992 | Maringer et al. | | 277/556 |
| 5,163,692 A * | 11/1992 | Schofield et al. | | 277/436 |
| 5,217,235 A | 6/1993 | Walker | | 277/348 |
| 5,288,086 A * | 2/1994 | Kiesel | | 277/554 |
| 5,328,177 A * | 7/1994 | Lair et al. | | 277/311 |
| 5,431,415 A | 7/1995 | Millonig | | 277/353 |
| 5,444,116 A | 8/1995 | Amin | | 524/495 |
| 5,461,107 A | 10/1995 | Amin | | 524/495 |
| 5,482,297 A | 1/1996 | Burns | | 277/644 |
| 5,524,905 A | 6/1996 | Thoman | | 277/572 |
| 5,575,484 A | 11/1996 | Burke | | 277/436 |
| 5,603,511 A | 2/1997 | Keyser, Jr. | | 277/337 |
| D379,493 S | 5/1997 | Woods | | D23/269 |
| D379,588 S | 6/1997 | Pledger | | D9/434 |
| 5,725,221 A * | 3/1998 | Pekarsky et al. | | 277/589 |
| 5,771,927 A * | 6/1998 | Johansen et al. | | 137/614.04 |
| 5,879,010 A | 3/1999 | Nilkanth | | 277/545 |
| 6,129,358 A * | 10/2000 | Kiesel et al. | | 277/436 |
| 6,173,964 B1 | 1/2001 | Bell | | 277/584 |
| 6,217,030 B1 * | 4/2001 | Zitting | | 277/435 |
| 6,318,729 B1 | 11/2001 | Pitts, Jr. | | 277/511 |
| 6,497,415 B2 * | 12/2002 | Castleman et al. | | 277/549 |
| 6,502,826 B1 * | 1/2003 | Schroeder et al. | | 277/468 |
| 6,598,690 B2 * | 7/2003 | Peterson | | 175/371 |
| 6,626,438 B2 * | 9/2003 | Walden | | 277/510 |
| 6,648,337 B1 * | 11/2003 | Baehl et al. | | 277/584 |
| 6,758,478 B1 * | 7/2004 | Moreno | | 277/584 |
| 2002/0158420 A1 * | 10/2002 | Castleman et al. | | 277/435 |
| 2003/0094766 A1 * | 5/2003 | Byrd | | 277/549 |
| 2004/0135319 A1 * | 7/2004 | Moreno | | 277/346 |

* cited by examiner

CAMMED SEAL ASSEMBLY WITH SEALING RING HAVING AN ANGLED LEG PORTION AND FOOT PORTION WITH ELASTOMERIC ENERGIZER ELEMENT

BACKGROUND OF THE INVENTION

The present invention relates to a seal assembly for sealing a clearance space or gap between first and second displaceable cylindrical surfaces, and more particularly to a seal assembly which includes an inclined "L" or foot-shaped element in contact with one of the cylindrical surfaces.

Seal assemblies designed for leakage control of fluid in pressurized hydraulic systems are generally known in the art. Such seals may be found, for example, in aerospace applications, including flight-controls, landing gears and hydraulic actuators. The seals used in such applications may have a variety of different geometries, while all performing generally the same function. Seals of different shapes and/or materials are better suited for different types (e.g., operating conditions) of applications. One problem with the seals for high-pressure hydraulic applications generally known in the art is that the sealing or cap element is often not energized in a manner such that the sealing element applies uniform pressure to the cylindrical surface which it contacts. Additionally, some of the hydraulic seals known in the art are not capable of withstanding the extreme high pressures and/or temperatures associated with highly-pressurized hydraulic systems. Accordingly, many of the prior art hydraulic seals are prone to leakage due to excessive wear and/or non-uniform load distribution on the cap element.

Accordingly, it is desirable to have a seal assembly for sealing a clearing space between first and second displaceable surfaces which is capable of preventing leakage in a high-pressure, high-temperature hydraulic system, by providing a uniform load distribution on the cap element, thereby resulting in longer seal life and better sealability. It should be noted that it is desirable to use simple hardware particularly in aerospace applications, since complexity of construction adds undesirable weight and cost. Therefore, closed-wall grooves for containing seals are required. This demands seal designs that are sufficiently flexible in construction to allow enough deformation for installation into closed-wall grooves while still providing adequate resistance to pressure extrusion, sealing efficiency and wear resistance. This is particularly applicable for rod-type seals and also for retro-fitting seals into existing gland configurations.

BRIEF SUMMARY OF THE INVENTION

Briefly stated, according to a first aspect of the present invention, a seal assembly is adapted for use in sealing first and second mating operational surfaces spaced apart by a gap. The first surface includes an annular seal assembly receiving groove. The groove is defined by a generally axial base surface and first and second generally radial side surfaces extending generally orthogonally from the base surface. A sealing element is configured to be located in the seal assembly receiving groove. The sealing element has a foot portion which extends generally parallel to the base surface and which is positioned to at least partially engage the second operational surface. A leg portion extends from the foot portion toward the base surface and has first and second surfaces, such that a first included angle between the first surface of the leg portion and the foot portion is obtuse and a second included angle between the second surface of the leg portion and the foot portion is acute. A back-up ring typically made from a relatively hard material is configured to be located in the seal assembly receiving groove adjacent to the sealing element to prevent extrusion of the sealing element into the gap between the first and second operational surfaces. The back-up ring has first and second sides. The first side of the back-up ring is configured to at least partially and complementarily mate with the second surface of the leg portion of the sealing element. The second side of the back-up ring is configured to at least partially mate with one of the first and second side surfaces of the seal assembly receiving groove. An energizer element is configured to be located in the seal assembly receiving groove between the base surface and the foot portion of the sealing element. The energizer element applies uniform pressure to the leg portion and the foot portion of the sealing element when the energizer element is in a compressed state.

According to a second aspect of the present invention, a seal assembly is adapted for use in sealing first and second mating operational surfaces spaced apart by a gap. The first surface includes first and second annular seal assembly receiving grooves, each of which are defined by a generally axial base surface and first and second generally radial side surfaces extending generally orthogonally from the respective base surface. A first sealing element is configured to be located in the first seal assembly receiving groove and positioned to at least partially engage the first operational surface. A second sealing element is configured to be located in the second seal assembly receiving groove. The second sealing element has foot portion which extends generally parallel to the base surface and which is positioned to at least partially engage the second operational surface. A leg portion extends from the foot portion toward the base surface and has first and second surfaces, such that a first included angle between the first surface of the leg portion and the foot portion is obtuse and a second included angle between the second surface of the leg portion and the foot portion is acute. A back-up ring typically made from a relatively hard material is configured to be located in the second seal assembly receiving groove adjacent to the second sealing element to prevent extrusion of the second sealing element into the gap between the first and second operational surfaces. The back-up ring has first, second and third sides. The first side of the back-up ring is configured to at least partially and complementarily mate with the second surface of the leg portion of the second sealing element. The second side of the back-up ring is configured to at least partially mate with one of the first and second side surfaces of the second seal assembly receiving groove. The third side of the back-up ring faces the second operational surface and has an angled recess which is at least partially spaced from the second operational surface. An energizer element is configured to be located in the second seal assembly receiving groove between the base surface and the foot portion of the second sealing element. The energizer element applies uniform pressure to the leg portion and the foot portion of the second sealing element when the energizer element is in a compressed state.

According to a third aspect of the present invention, a seal assembly is adapted for use in sealing first and second mating operational surfaces spaced apart by a gap. The first surface includes first, second and third annular seal assembly receiving grooves, each of which are defined by a generally axial base surface and first and second generally radial side surfaces extending generally orthogonally from the respective base surface. A first sealing element is configured to be located in the first seal assembly receiving groove and positioned to at least partially engage the first operational surface. A second sealing element is configured to be located in the second seal assembly receiving groove. The second sealing element has foot portion which extends generally parallel to the base surface and which is positioned to at least partially engage the second operational surface. A leg portion extends from the foot portion toward the base surface and has first and second surfaces, such that a first included angle between the first surface of the leg portion and the foot portion is obtuse and a second included angle between the second surface of the leg portion and the foot portion is acute. A back-up ring typically made from a relatively hard material is configured to be located in the second seal assembly receiving groove adjacent to the second sealing element to prevent extrusion of the second sealing element into the gap between the first and second operational surfaces. The back-up ring has first and second sides. The first side of the back-up ring is configured to at least partially and complementarily mate with the second surface of the leg portion of the second sealing element. The second side of the back-up ring is configured to at least partially mate with one of the first and second side surfaces of the second seal assembly receiving groove. An energizer element is configured to be located in the second seal assembly receiving groove between the base surface and the foot portion of the second sealing element. The energizer element applies uniform pressure to the leg portion and the foot portion of the second sealing element when the energizer element is in a compressed state. A scraper element is configured to be located in the third seal assembly receiving groove and is positioned to at least partially engage the second operational surface when the seal assembly is in use.

According to a fourth aspect of the present invention, a seal assembly is adapted for use in sealing first and second mating operational surfaces spaced apart by a gap. The first surface includes first and second annular seal assembly receiving grooves, each of which are defined by a generally axial base surface and first and second generally radial side surfaces extending generally orthogonally from the respective base surface. A first sealing element is configured to be located in the first seal assembly receiving groove and positioned to at least partially engage the first operational surface. A second sealing element is configured to be located in the second seal assembly receiving groove and is positioned to at least partially engage the second operational surface. A back-up ring typically made from a relatively hard material is configured to be located in the second seal assembly receiving groove adjacent to the second sealing element to prevent extrusion of the second sealing element into the gap between the first and second operational surfaces. The back-up ring has first, second and third sides. The first side of the back-up ring is configured to at least partially engage the second sealing element. The second side of the back-up ring is configured to at least partially mate with one of the first and second side surfaces of the second seal assembly receiving groove. The third side of the back-up ring facing the second operational surface includes an angled recess which is at least partially spaced from the second operational surface. An energizer element is configured to be located in the second seal assembly receiving groove between the base surface and the second sealing element. The energizer element applies pressure to the second sealing element and the back-up ring when the energizer element is in a compressed state.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown.

In the drawings.

DETAILED DESCRIPTION OF THE INVENTION

Figure 1:
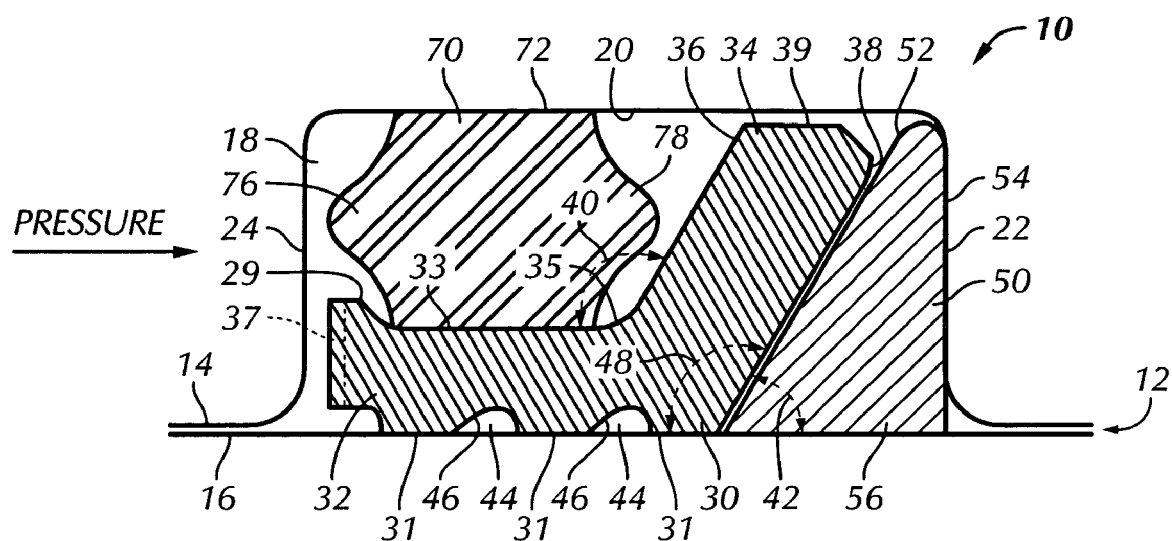
FIG. 1 is a cross-sectional view of a seal assembly in an installed and unpressurized state in accordance with a preferred embodiment of the present invention.

Certain terminology is used in the following description for convenience only and is not considered limiting. The words "right," "left," "lower," and "upper" designate directions in the drawings to which reference is made. The words "inwardly" and "outwardly" refer to directions toward and away from, respectively, the geometric center of the seal assembly and designated parts thereof. The terminology includes the words above specifically mentioned, derivatives thereof and words of similar import.

Figure 2:
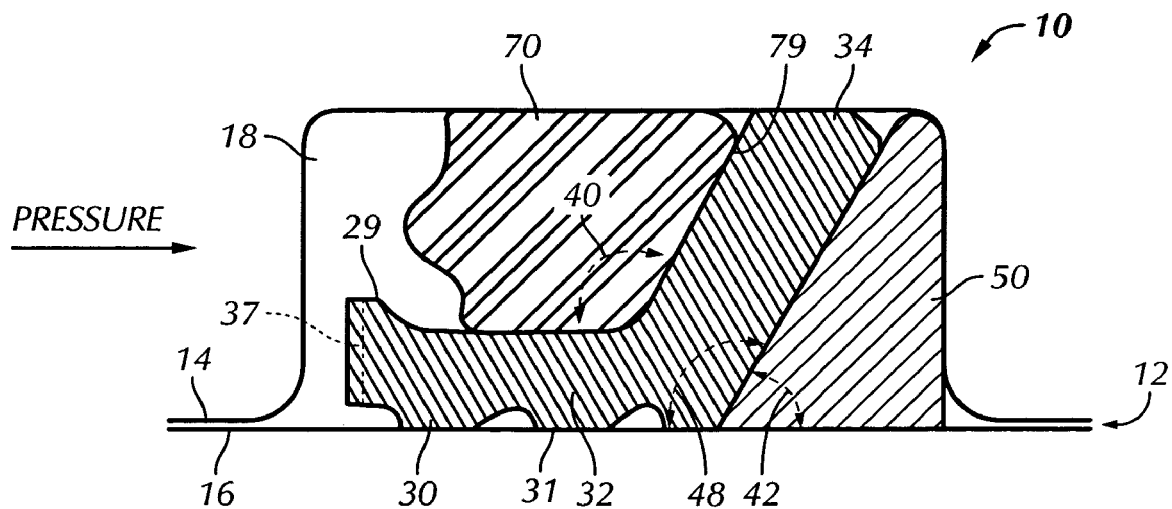
FIG. 2 is a cross-sectional view of the seal assembly shown in FIG. 1 in a partially pressurized state.
Figure 3:
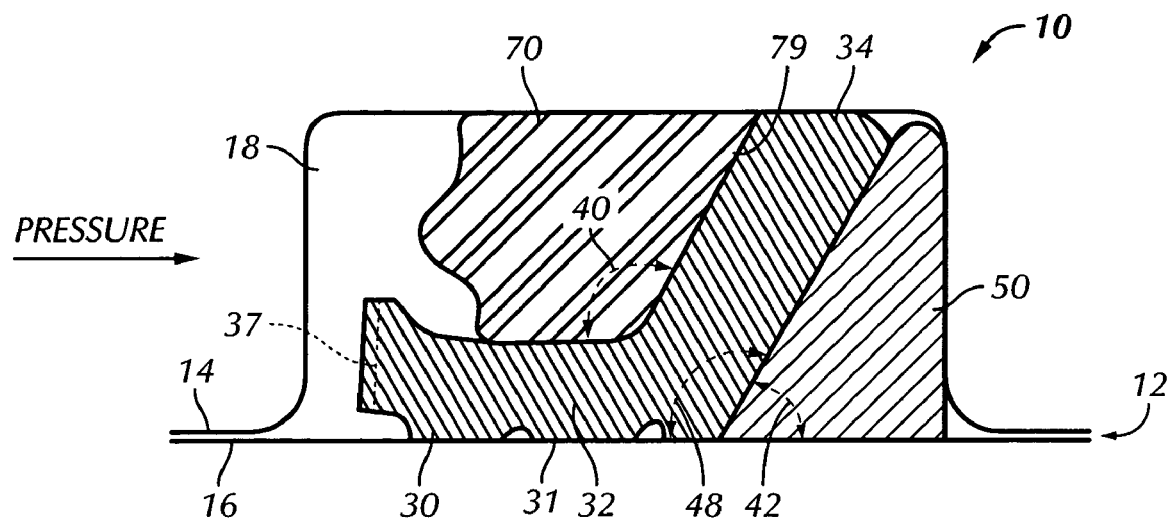
FIG. 3 is a cross-sectional view of the seal assembly of FIG. 1 in a highly pressurized state.

Referring now to the drawings in detail, wherein like numerals are used to indicate like elements throughout, there is shown in FIGS. 1-3 a seal assembly, generally designated 10, in accordance with a preferred embodiment of the present invention. The seal assembly 10 is used for sealing a clearance space or gap 12 between first and second mating operational surfaces 14, 16, respectively. The first surface 14 includes a generally annular seal assembly receiving groove 18 therein. The seal assembly receiving groove 18 is generally rectangular in cross-section and is defined by a generally axial base surface 20 and first and second generally radial side surfaces 22, 24, respectively, which extend generally orthogonally from the base surface 20.

The first and second operational surfaces 14, 16 are preferably axially displaceable with respect to each other. The first surface 14 may define a generally cylindrical opening and the second surface 16 may define a generally cylindrical complementary shape which is slidingly disposed within the opening defined by the first surface 14. Examples of typical members on which the first and second surfaces 14, 16 reside include a housing and rod, respectively. In such a system, the seal assembly receiving groove 18 faces radially inwardly (e.g., opens toward the rod) and the second surface 16 faces radially outwardly, such a seal assembly generally being referred to as a rod-type seal. However, it is understood by those of ordinary skill in the art that the seal assembly receiving groove 18 could face radially outwardly and the second surface 16 could face radially inwardly without departing from the spirit and scope of the present invention, such a seal assembly generally being referred to as a piston-type seal.

Referring to FIG. 1, the seal assembly 10 (shown in an unpressurized state) includes a generally annular cap or sealing element 30, having a generally inclined "L" or foot-shaped cross section. The sealing element 30 is configured to be located within the seal assembly receiving groove 18. The sealing element 30 includes a foot portion 32 which is spaced from the base surface 20 and which extends generally parallel thereto. The foot portion 32 is thus positioned such that a lower surface 31 of the foot portion 32 partially engages and mates with the second operational surface 16 when the sealing element 30 is positioned within the seal assembly receiving groove 18. The upper surface 33 of the foot portion 32 is generally flat and parallel to the axial base surface 20. At the end of the foot portion 32 which faces the second side surface 24 of the seal assembly receiving groove 18, the upper surface 33 transitions upwardly toward the axial base surface 20 to a retaining lip 29.

The sealing element 30 further includes a leg portion 34 which extends upwardly at an incline from the foot portion 32 toward the base surface 20. The leg portion 34 has generally a similar thickness as the foot portion 32. The leg portion 34 includes generally parallel first and second surfaces 36, 38, respectively. A first included angle 40 is defined between the first surface 36 of the leg portion 34 and the foot portion 32 and is preferably obtuse. A second included angle 42 facing away from the foot portion 32 is defined between the second surface 38 of the leg portion 34 and the second operational surface 16 and is preferably acute. Preferably, the sum total of the first and second angles 40 and 42 is approximately 180 degrees. Thus, the leg portion 34 extends upwardly from the foot portion 32 toward the base surface 20 at a sloped angle with respect to the second operational surface 16. The leg portion 34 is connected to the foot portion 32 by a radial transition 35 which helps alleviate stress on the sealing element 30. The leg portion 34 further includes a top surface 39 which is generally flat and parallel to the base surface 20. Accordingly, the sealing element 30 preferably has a cross-sectional shape generally as shown in FIGS. 1-3.

The foot portion 32 of the sealing element 30 further preferably includes one or more grooves 44 which face the second operational surface 16. The upper portion of the grooves 44 is preferably arcuate in shape. Furthermore, the grooves 44 preferably include a side portion 46 which is non-orthogonal with respect to the foot portion 32. That is, as shown, for example, in FIG. 1, the grooves 44 form spaces having a sloped, arcuate cross-sectional shape over the second surface 16 between the portions of the lower surface 31 of the leg portion 32 which are in contact with the second surface 16. The arcuate and angled shape of the grooves 44 helps to increase the sealing contact of the leg portion 32 with the second surface 16 when pressure is applied on the sealing element 30 against the second operational surface 16. That is, providing grooves in the lower surface 31 of the foot portion 32 allows for the forces provided to the foot portion 32 and applied against the second operational surface 16 to be distributed to only the portions of the lower surface 31 which are actually in contact with the second operational surface 16. Thus, a higher sealing force is achieved between the foot portion 32 and the second operational surface 16 since the pressure on the entire foot portion 32 is actually applied to the second operational surface 16 along less of a contact surface. Furthermore, the arcuate shape of the grooves 44 allows the force on the foot portion 32 to be evenly distributed to the portions of the lower surface 31 which contact the second operational surface 16. Thus, the arcuate shape of the grooves 44 helps prevent wear and cracking of the sealing element 30 caused by uneven distribution of forces on the foot portion 32 and grooves 44. Additionally, the shape of the grooves 44 helps to retain fluid as the seal moves in one direction (sealing), while encouraging blow-by of fluid (venting) in the reverse direction. More specifically, as the seal assembly 10 moves in the direction of the arrows as shown in FIGS. 1-3, the angle of the side portions 46 of the grooves 44 allows small amounts of fluid to flow past the sealing element 30, thus allowing the system to vent.

The sealing element 30 further includes one or more notches 37 disposed in the side of the sealing element 30 that faces the second side surface 24 of the seal assembly receiving groove 18. The notches 37 preferably run longitudinally from the upper surface 33 to the lower surface 31 of the foot portion 32. The notches 37 prevent the sealing element 30 from sealing with the second side surface 24 in the event that the seal assembly 10 (in the absence of pressure) shifts within the seal assembly receiving groove 18 toward the second side surface 24. Thus, upon the recurrence of pressure from the direction of the arrow, the pressure will force the seal assembly 10 toward the first side surface 22 and into the proper sealing position, thereby preventing blow-by. Those skilled in the art will understand that the notches 37 may generally take the form of any radially continuous imperfection in the side of the sealing element 30.

The sealing element 30 is preferably made of a resilient polymeric material having a low degree of wear, and more preferably a thermoplastic and carbon filled PTFE. However, those of ordinary skill in the art will understand that the sealing element 30 could be made of other suitable materials, such as mineral and molybdenum disulphide filled PTFE, graphite filled PTFE, pigmented and molybdenum disulphide filled PTFE, polyimide filled PTFE, or any other suitable polymeric material, without departing from the spirit and scope of the present invention.

The seal assembly 10 further includes an anti-extrusion or backup ring 50 located within the seal assembly receiving groove 18. The backup ring 50 is preferably positioned within the seal assembly receiving groove 18 adjacent to the sealing element 30 to prevent extrusion of the sealing element 30 into the sealing gap 12 between the first and second operational surfaces 14, 16 when pressure is applied to the sealing element 30. Preferably, the backup ring 50 is generally triangular in cross section and is preferably scarf cut in a manner well known in the art for ease of installation into closed grooves.

The backup ring 50 includes first and second sides 52, 54, respectively. The backup ring 50 is positioned within the seal assembly receiving groove 18 such that the first side 52 of the backup ring 50 at least partially and complementarily mates with the second surface 38 of the leg portion 34 of the sealing element 30. A third included angle 48 is defined between the first side 52 of the backup ring 50 and a portion of the second operational surface 16 located below the lower surface 31 of the foot portion 32 and is preferably obtuse. More preferably, the third included angle 48 is approximately equal to the first included angle 40, such that the first side 52 of the backup ring 50 and the leg portion 34 of the sealing element 30 are parallel to each other, extending upwardly toward the base surface 20 at the same angle with respect to the second operational surface 16. Such a configuration allows the second surface 38 of the leg portion 34 to fully mate with the first side 52 of the backup ring 50.

The second side 54 of the backup ring 50 is preferably parallel to the side surfaces 22, 24 and mates with one of the first and second side surfaces 22, 24 of the seal assembly receiving groove 18. That is, as shown in the embodiment of FIGS. 1-3, the second side 54 of the backup ring 50 mates with the first side surface 22 of the seal assembly receiving groove 18. However, those of ordinary skill in the art will recognize that the backup ring 50 and the sealing element 30 may be configured and positioned such that the second side 54 of the backup ring 50 mates with the second side surface 24 of the seal assembly receiving groove 18. A third surface 56 of the backup ring 50 is preferably parallel to the base surface 20 and mates with the second operational surface 16 when the seal assembly 10 is placed in the seal assembly receiving groove 18. Thus, the backup ring 50 closes the clearance gap 12 between the first and second surfaces 14, 16, thereby preventing extrusion of the sealing element 30 into the clearance gap 12 when the sealing element 30 is under pressure. Those skilled in the art will recognize that the backup ring 50 may also be configured to act as a scraper element to remove unwanted dirt, debris or ice from the second operational surface 16 to protect the sealing element 30 as the seal assembly 10 moves back and forth. Scraper elements are well-known in the sealing arts.

Figure 4:
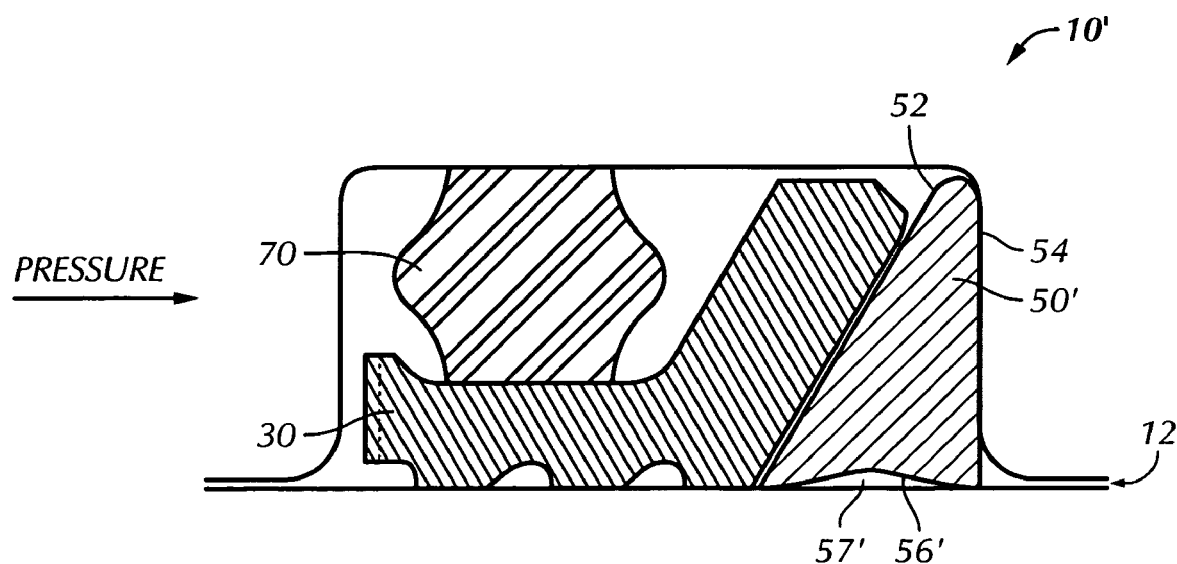
FIG. 4 is a cross-sectional view of a seal assembly in an installed and unpressurized state in accordance with a second preferred embodiment of the present invention.

Referring to FIG. 4, an alternative embodiment of a seal assembly 10' in accordance with the present invention is shown. For simplicity, in describing the seal assembly 10', only those elements that are different with respect to the seal assembly 10 of FIGS. 1-3 are discussed. Those elements of the seal assembly 10' which are the same or substantially similar to the seal assembly 10 are labeled in FIG. 4 with the same reference numerals as described above. In the seal assembly 10' the third side 56' of the backup ring 50' does not completely engage and mate with the second operational surface 16 as described above. Rather, the third side 56' includes a recess 57', such that at least a portion of the third side 56' is partially spaced from the second operational surface 16. Preferably, the recess 57' is angled or is generally in the shape of a "V", as shown in FIG. 4. The angled shape of the recess 57' allows greater downward pressure to be exerted by the backup ring 50' on the second operational surface 16, thus providing additional resistance to the sealing element 30 extruding into the clearance gap 12. Such a configuration also allows the backup ring 50' to function as a scraper element for the seal assembly 10 as described above. The third side 56' and/or the recess 57' of the backup ring 50' may be configured in other manners well known in the art so long as the back-up ring 50' remains capable of preventing extrusion of the sealing element 30 into the clearance gap 12 and also of scraping the second operational surface 16 when pressure is applied to the sealing element 30.

The backup ring 50 is preferably made from a material which is relatively harder than that of the sealing element 30 and which is applicable for use in high pressure and/or large diametric clearance applications, as is typically found in the industry for scraper groove designs. For example, nylon or a thermoplastic such as a lubricated polyetheretherketone may be used. Those of ordinary skill in the art will recognize that the backup ring 50 may be made from other materials without departing from the spirit and scope of the present invention. For example, in lower pressure and/or tight diametric clearance applications in which less strength and/or lower friction is required, the backup ring 50 may be made of PTFE based materials similar to those noted above with respect to the sealing element 30.

The seal assembly 10 further includes an energizer element 70 similar to energizer or expander elements generally known in the art. The energizer element 70 biases the sealing element 30 into sealing engagement with the second operational surface 16. The energizer element 70 is preferably disposed in the seal assembly receiving groove 18 between the base surface 20 and the foot portion 32 of the sealing element 30. The energizer element includes an upper surface 72 which is generally flat and parallel to the base surface 20 of the seal assembly receiving groove 18. As shown in the unpressurized state of FIG. 1, the upper surface 72 of the energizer element preferably contacts and mates with the base surface 20. Similarly, the energizer element 70 includes a lower surface 74 which is generally parallel to the upper surface 72. The lower surface 74 mates with at least a portion of the upper surface 33 of the foot portion 32. In the unpressurized state, the energizer element 70 is sized such that the upper surface 33 of the foot portion 32 of the sealing element 30 fits around the lower surface 74 of the energizer element 70. Thus, the energizer element 70 resides on the upper surface 33 between where the foot portion 32 transitions to the leg portion 34 where the foot portion 32 transitions to the retaining lip 29 on the opposite side thereof.

In the unpressurized state, the energizer element 70 has a generally rectangular cross-sectional shape which includes first and second protrusions 76, 78 on opposing sides thereof. The energizer element 70 is preferably designed to bias both the foot portion 32 radially outward into the second operational surface 16, and simultaneously bias the leg portion 34 generally in the axial direction into the backup ring 50 as discussed in greater detail below. The protrusions 76, 78 allow the energizer element 70 to extend approximately the length of the sealing element 30 for stability, thus helping to prevent rocking of the sealing element 30. Additionally, the protrusions 76, 78 provide extra free space into which the energizer element 70 extends when compressed.

Preferably, the energizer element 70 is preferably made of a durable, flexible elastomeric material. For example, depending on the specific application (fluid, temperature, etc.) in which the seal assembly 10 is to be used, the energizer element 70 may be made of elastomers such as a nitrile or an ethylene propylene compound. Any other suitable elastomer which has the required elastic properties, such as fluorosilicone or fluorocarbon, could be used without departing from the spirit and scope of the present invention.

FIGS. 1-3 show, in succession of increasing states of pressure on the seal assembly 10, the manner in which the seal assembly 10 deforms. As noted above, FIG. 1 shows the seal assembly 10 and its corresponding elements in an unpressurized state. As pressure is applied to the seal assembly 10, the energizer element 70 "cams" in both the axial and radial directions such that the side of the energizer element 70 having the second protrusion 78 substantially deforms, resulting in a deformed surface 79 which is generally parallel to the first surface 36 of the leg portion 34 of the sealing element 30 (see FIGS. 2 and 3). Thus, as the energizer element 70 deforms, it is depressed radially inwardly into the upper surface 33 of the foot portion 32 of the sealing element 30. Simultaneously, the energizer element 70 complementarily mates with and presses against the first surface 36 of the leg portion 34. As greater pressure is applied to the seal assembly 10, the energizer element 70 further deforms to fill all of the space shown in FIG. 1 between the energizer element 70 and the leg portion 34 of the sealing element 30. Accordingly, in the highly compressed state of FIG. 3, the upper and lower surfaces 72, 74 of the sealing element 70 extend from the first surface 36 of the leg portion 34 along the base surface 20 and the upper surface 33 of the foot portion 32. The camming action and resultant deformation allows the energizer element 70 to apply uniform pressure to both the foot portion 32 and the leg portion 34 of the sealing element 30 when pressure is applied to the seal assembly 10. As a result, the sealing element 30 engages the second operational surface 16 via the lower surface 31 of the foot portion 32 and over the grooves 44 to create a uniformly distributed seal between the first and second operational surfaces 14, 16.

As the energizer element 70 is cammed into the sealing element 30, the leg portion 34 of the sealing element 30 is biased axially against the first surface 52 of the backup ring 50. Since the backup ring 50 is preferably made of a harder material than the sealing element 30, the leg portion 34 thus partially is forced to expand upwardly along the first surface 52 of the backup ring 50 into the seal assembly receiving groove 18, such that the top surface 39 of the leg portion 34 mates with the axial base surface 20 of the seal assembly receiving groove 18. Since the lower surface 56 of the backup ring 50 is in contact with the second operational surface 16, neither the foot portion 32 nor the leg portion 34 are able to extrude into the sealing gap 12. As such, the foot portion 32 exerts sealing force against the second operational surface 16, and the leg portion 34 is permitted to only expand upwardly to mate with the axial base surface 20 in response to the camming action of the energizer element 70. In a similar manner, force from the energizer element 70 cams the backup ring 50 to maintain intimate contact with both the base surface 20 and the second operational surface 16. Thus, as shown in FIGS. 2 and 3, both the sealing element 30 and the backup ring 50 maintain generally the same cross-sectional shape under pressure as in the unpressurized state of FIG. 1. Likewise, the backup ring 50' of FIG. 4 maintains shape as the pressure increases.

A further advantage to the seal assembly 10 described above with respect to FIGS. 1-4 is that the energizer element 70 and the sealing element 30 may be easily installed into a closed rod-type gland using the Marcelling technique which is generally known in the sealing art. Because the leg portion 34 is at an angle with respect to the foot portion 32 as described above, when the sealing element 30 is marcelled for installation into the seal assembly receiving groove 18, the leg portion 34 tends to flatten (i.e., the first included angle 40 approaches 180 degrees). As such, the "flattened" sealing element 30 is easily inserted into the seal assembly receiving groove 18. Because of the angled, foot-shaped cross-section of the sealing element 30 in its natural, unpressurized state, the sealing element 30 tends to naturally achieve the desired position (see FIG. 1) within the seal assembly receiving groove 18 without additional distortions to the sealing element which may render the marcelling process impossible or otherwise damage the seal. Furthermore, as noted above, the foot and leg portions 32, 34 of the sealing element 30 have a generally uniform thickness. Thus, during installation using the marcelling process, the sealing element is easily adjusted and maneuvered around the energizer element 70 and the receiving groove 18 and does not incur additional stresses which tend to weaken the seal, as is the case with sealing element which has non-uniform thickness. Those skilled in the art will recognize that a high pressure seal which permits installation in a closed groove using the marcelling technique in a manner which is simpler, more efficient and causes less seal damage compared with other known high pressure seals is highly advantageous. The seal assembly 10 described herein may also be installed using other seal installation techniques generally known to those skilled in the art.

The seal assembly 10 functions as a unidirectional seal, and may be utilized as a primary or secondary seal in a variety of seal systems.

Figure 5:
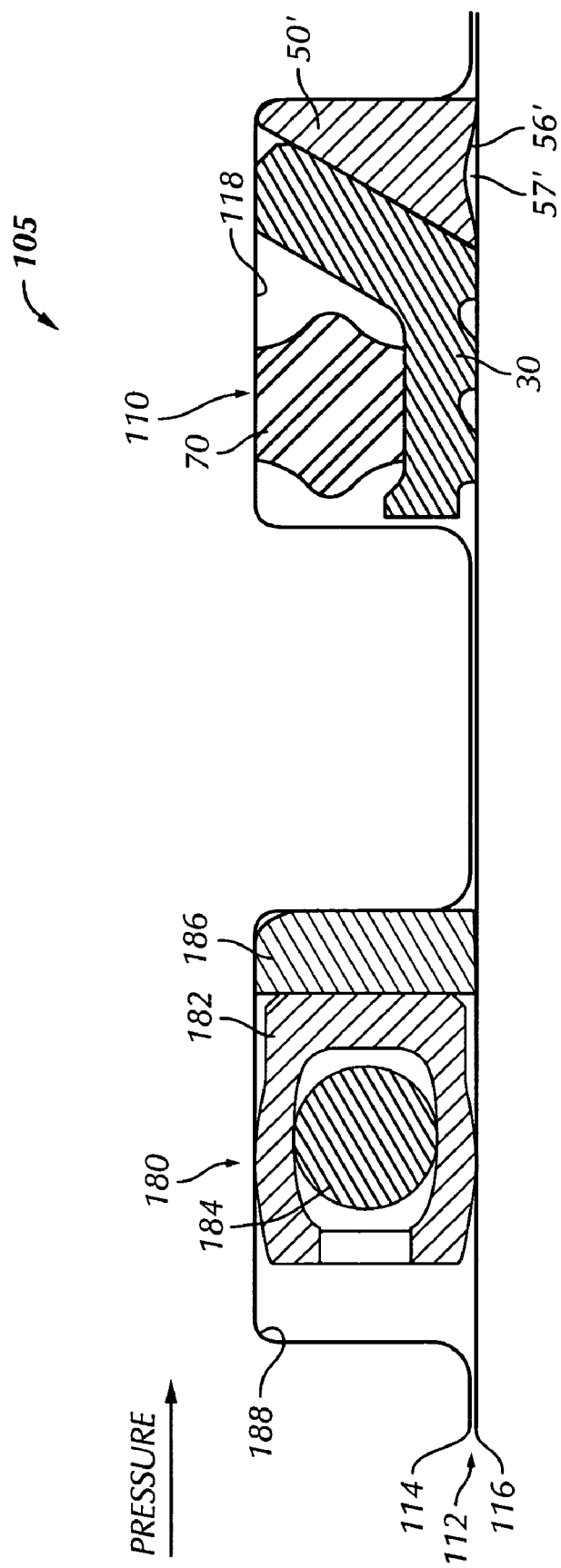
FIG. 5 is a cross-sectional view of a seal system in an installed and unpressurized state in accordance with a third preferred embodiment of the present invention.

In another embodiment according to the present invention, the seal assembly 10 described above with respect to FIGS. 1-4 may also be used in combination with other known seal assemblies to provide more advantageous sealing results. Referring to FIG. 5, a tandem seal system 105 having multiple seal assemblies 110, 180 is shown. Tandem seal systems are generally known in the art, and generally include one seal assembly that acts as a primary seal and one or more remaining seal assemblies that act as secondary seal(s). In the seal system 105, the seal assembly 180 is the primary seal and resides in the seal assembly receiving groove 188 to seal the clearance gap 112 between the first and second mating operational surfaces 114, 116, respectively.

The primary seal assembly 180 includes a sealing element 182 which is preferably generally C-shaped, and preferably capable of sealing the clearance gap 112 against leakage at low temperatures. The sealing element 182 is preferably a metal spring energized ("MSE") type of seal. That is, the sealing element 182 is one which would typically be used with a metal spring energizer. MSE seals are generally known in the art. However, the seal assembly 180 preferably includes an elastomeric energizer element 184 which is contained within a jacket formed by the C-shape of the sealing element 182. The energizer element 184 is preferable in the form of an O-ring, but may be other configurations well-known to those skilled in the art. Since it is often desirable to use a seal assembly capable of functioning at temperatures down to −65° F., and below, the energizer element 184 is preferably made of fluorosilicone ("FVMQ"), which has a temperature range from −80° F. to 350° F. Thus, one advantage of using FVMQ as the material forming the energizer element 184 is that FVMQ has an excellent range of useable temperatures. Although FVMQ is a relatively soft, tender material and thus has poor wear resistance, since the energizer element 184 is contained within the jacket of the sealing element 182, the energizer element 184 is generally protected from the elements and from wear against the inside of the seal assembly receiving groove 188. The energizer element 184 may be made of other soft, low temperature materials in accordance with the present invention. For example, perfluoroether is capable of functioning at −80° F., and is a soft material of which the energizer element 184 could be made. The seal assembly 180 further includes a backup ring 186 which helps prevent extrusion of the sealing element 182 into the clearance gap 112 in a manner well understood by those skilled in the art. When installed and pressurized, the seal assembly 180 shown in FIG. 5 thus forms a unidirectional seal against pressure in the direction of the arrow shown in FIG. 5.

Since the seal assembly 180 prevents low temperature leakage through the clearance gap 112, in the seal system 105 there is a need to prevent leakage at temperatures greater than those for which the sealing element 182 is applicable. In the seal system 105, the secondary seal is the seal assembly 110. The seal assembly 110 is substantially similar to the seal assembly 10' described above and with reference to FIG. 4 and includes all of the same features described above with reference to FIGS. 1-4. In particular, the seal assembly 110 includes the backup ring 50' having the recess 57'. Because the energizer element 70 is made of fluorocarbon ("FKM"), the energizer element 70 has better wear resistance than the energizer element 184. Thus, the fact that the energizer element 70 is exposed to and contacts the seal assembly receiving groove 118 is not significant. As the temperature of the environment in which the seal system 105 operates decreases, the fluid to be sealed becomes more viscous. Thus, the primary seal assembly 180 (designed to prevent low temperature leakage) seals the clearance gap 112 when the seal assembly 110 (e.g., the secondary seal assembly) is less capable or is no longer capable of sealing the clearance gap 112. Alternate materials may be used such as perfluoroether and EPDM in phosphate ester fluid systems.

One advantage of using the seal system 105 shown in FIG. 5 is the elimination of a third seal assembly (not shown) often used in tandem seal systems. More specifically, in typical flight control or other hydraulic applications, there is often a primary seal, a secondary seal and a scraper element (placed in a third seal assembly receiving groove). As described above, the purpose of a scraper element is to remove unwanted dirt, debris and ice from the second operational surface as well as to protect other sealing element(s) as they traverse the second operational surface. Typically, such scraper elements utilize their own energizer element. However, the combination of a seal assembly and a scraper element eliminates the need for a separate, individual scraper element as a third assembly in a tandem seal system. Thus, in the configuration shown in FIG. 5, the scraper assembly (not shown) has been replaced by the secondary seal assembly 110 that includes the backup ring 50', which itself functions as both a backup ring and a scraper element. Testing has shown that this configuration actually results in better sealability than a seal system having a separate scraper element with its own energizer. Thus, the scraper element in a traditional tandem seal system not only scrapes away dirt and debris from the second operational surface, but also has a tendency to scrape away a boundary layer of fluid with each pass across this surface. This boundary layer removal of fluid leads to additional leakage of fluid through the clearance gap. However, adding the scraper element to the seal assembly 110 as described above results in a scraper element which does not apply as much downward pressure against the second operational surface as a traditional individually energized scraper element. Because of its structure, the backup ring 50' is still capable of scraping away dirt and debris from the second operational surface, but is not strong enough to scrape away the additional boundary layer of fluid. Thus, less fluid is lost with each pass of the seal assembly 110 across the second operational surface.

In the tandem seal system 105 described above and with reference to FIG. 5, those skilled in the art will recognize that the seal assembly 180 could be any combination of sealing element, energizer and backup ring known to those skilled in the art which would form a primary seal having the ability to prevent leakage at low temperatures. Any such primary seal is capable of functioning with the seal assembly 110.

Figure 6:
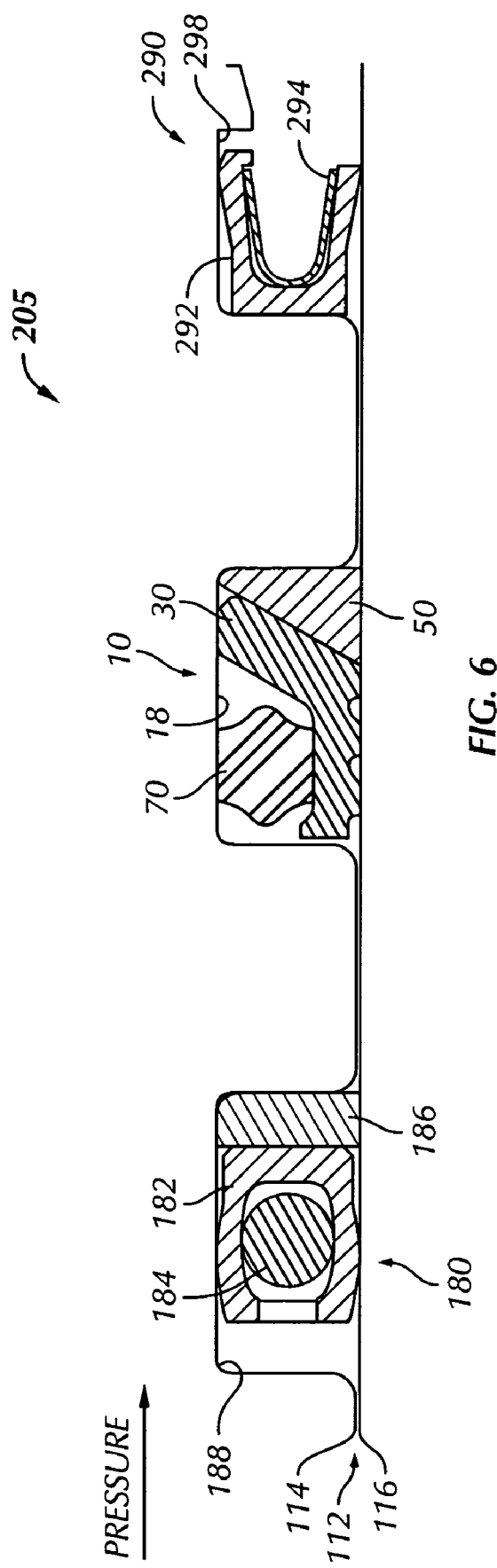
FIG. 6 is a cross-sectional view of a seal system in an installed and unpressurized state in accordance with a fourth preferred embodiment of the present invention.

Additionally, those skilled in the art will recognize that the seal assembly 10 of FIG. 1 (e.g., a seal assembly having the backup ring 50) could be used in combination with a primary seal (such as the seal assembly 180 described above) and either a traditional scraper element (see, for example FIG. 6) or a recessed scraper element (e.g., the backup ring 50') located in a third gland or receiving groove in accordance with the scope of the present invention. FIG. 6 shows a seal system 205 according to the present invention having a primary seal assembly 180, a secondary seal assembly 10 that includes the sealing element 30, the energizer element 70 and the back up ring 50, and a scraper assembly 290 that includes a scraper element 292 and an energizer element 294 in a scraper assembly receiving groove 298. The energizer element 294 shown in FIG. 6 is preferably a metal spring energizer as is generally known in the art. Those skilled in the art will recognize that the scraper assembly 290 may utilize any combination of scraper and/or energizer element(s) generally known in the art such that the seal system 205 includes a scraper element having the characteristics described above.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A seal assembly adapted for use in sealing first and second mating operational surfaces spaced apart by a gap, said first surface including an annular seal assembly receiving groove, said groove being defined by a generally axial base surface and first and second generally radial side surfaces extending generally orthogonally from the base surface, the seal assembly comprising:
   a sealing element configured to be located in the seal assembly receiving groove, the sealing element having a foot portion which extends generally parallel to the base surface and which is positioned to at least partially engage the second operational surface and a leg portion extending from the foot portion toward the base surface, the leg portion having first and second surfaces, wherein a first included angle between the first surface of the leg portion and an upper surface of the foot portion is obtuse;
   a back-up ring made from a relatively hard material and configured to be located in the seal assembly receiving groove adjacent to the sealing element to prevent extrusion of the sealing element into the gap between the first and second operational surfaces, the back-up ring having first and second sides, and a third bottom surface extending between the first and second sides of the back-up ring, the first side of the back-up ring configured to at least partially and complementarily mate with the second surface of the leg portion of the sealing element, the second side of the back-up ring configured to at least partially mate with one of the first and second side surfaces of the seal assembly receiving groove wherein a second included angle between the second surface of the leg portion and the third surface of the back-up ring is acute; and
   an energizer element configured to be located in the seal assembly receiving groove between the base surface and the foot portion of the sealing element, wherein the energizer element applies uniform pressure to the leg portion and the foot portion of the sealing element when the energizer element is in a compressed state.

2. The seal assembly of claim 1 wherein the energizer element cams into the leg portion of the sealing element to provide uniform pressure against the first side of the back-up ring.

3. The seal assembly of claim 1 wherein the foot portion includes at least one groove in a lower surface of the foot portion, wherein the groove faces the second operational surface.

4. The seal assembly of claim 3 wherein an upper portion of the at least one groove is arcuate.

5. The seal assembly of claim 3 wherein the at least one groove includes at least one side portion which is angled with respect to the lower surface of the foot portion.

6. The seal assembly of claim 1 wherein the first included angle and the second included angle total approximately 180 degrees.

7. The seal assembly of claim 1 wherein a third included angle between the first side of the back-up ring and a lower surface of the foot portion is obtuse.

8. The seal assembly of claim 1 wherein a third included angle between the first side of the back-up ring and a lower surface of the foot portion is approximately equal to the first included angle.

9. The seal assembly of claim 1 wherein the third bottom surface of the back-up ring includes an angled recess which is at least partially spaced from the second operational surface.

10. The seal assembly of claim 9 wherein the recess is generally in the shape of a "V".

11. The seal assembly of claim 9 wherein at least a portion of the third bottom surface of the back-up ring is configured to scrape the second operational surface when the energizer element is in the compressed state.

12. The seal assembly of claim 1 wherein the back-up ring is configured to scrape the second operational surface when the seal assembly is in use.

* * * * *